United States Patent
Atchison

[19]

[11] Patent Number: 5,887,882
[45] Date of Patent: Mar. 30, 1999

[54] PRONE BICYCLE

[76] Inventor: James P. Atchison, 5506 S. Cumnor Rd., Downers Grove, Ill. 60516-1528

[21] Appl. No.: 778,191

[22] Filed: Jan. 2, 1997

Related U.S. Application Data

[63] Continuation of Ser. No. 450,893, May 26, 1995, abandoned.

[51] Int. Cl.$^6$ .............................. B62K 3/10; B62K 15/00; B62K 21/16
[52] U.S. Cl. ..................... 280/288.1; 74/551.3; 280/261; 280/278; 280/287
[58] Field of Search ................................ 280/288.1, 287, 280/274, 278, 259, 288.4; 74/551.1, 551.3, 551.4, 551.8, 551.9

[56] References Cited

U.S. PATENT DOCUMENTS

| | | | |
|---|---|---|---|
| 436,978 | 9/1890 | Hoyt | 74/551.9 |
| 4,198,072 | 4/1980 | Hopkins | 280/288.1 |
| 4,411,443 | 10/1983 | Pollard | 280/288.1 |
| 4,647,060 | 3/1987 | Tomkinson | 280/288.1 |
| 4,873,886 | 10/1989 | Renner | 74/551.8 |
| 5,197,350 | 3/1993 | Borromeo | 74/551.3 |
| 5,544,906 | 8/1996 | Clapper | 280/288.1 |

Primary Examiner—Anne Marie Boehler
Attorney, Agent, or Firm—Eagle & Eagle; James B. Eagle

[57] ABSTRACT

The present invention is a bicycle which permits the rider to operate the bicycle while in the prone position. A novel sling is provided to support the torso of the rider. The sling is a hammock-style sling which supports the rider comfortably and enables the rider to go much farther, without tiring, than other prone bicycles. Further, the sling is made of nylon, or other fabric, which allows the rider's chest cavity to expand in order to facilitate breathing. And, unlike other prone bicycle designs, there is no sliding up and down with this hammock-style sling. A telescoping frame and pivoting handgrips enables the rider to adjust the bicycle to his or her own body dimensions. The present invention provides less wind resistance due to the prone position of the rider. Also, the alignment of the arms and hands with the legs and feet allows the pushing force of the legs and feet to be opposite to, and in line with, the pushing force of the arms and hands. This alignment eliminates moments and the resultant forces from developing relative to the rider's body and therefore eliminates much wasted effort.

7 Claims, 4 Drawing Sheets

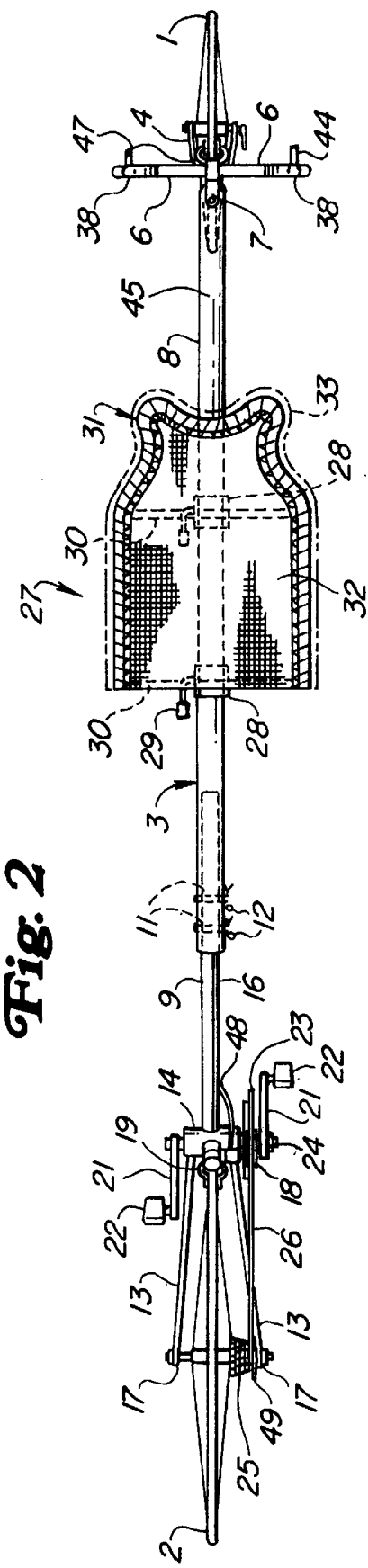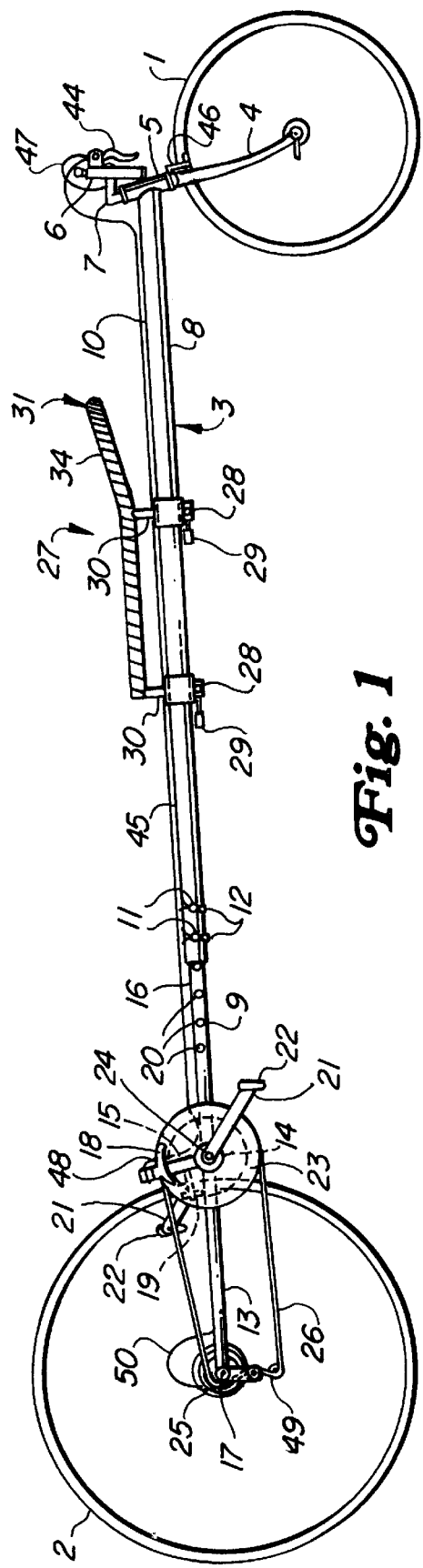

PRONE BICYCLE

This application is a continuation of application Ser. No. 08/450,893 filed on May 26, 1995, now abandoned.

BACKGROUND OF THE INVENTION

1. Field of the Invention

The present invention relates to bicycles used for touring long distances in an efficient and comfortable manner.

2. Description of the Prior Art

The prior art contains many bicycles each with their special characteristics.

The Arroyo Patent (U.S. Pat. No. 4,838,568) is a bicycle which uses the motion of the rider's arms to help propel the unit. It is particularly useful for training for triathelons where the contestants must swim, run and ride a bicycle over long distances. The Arroyo Patent allows the triathelete-in-training to simultaneously exercise his or her arms for swimming and legs for bicycle riding.

The Speicher Patent (U.S. Pat. No. 4,431,205) is a golf cart which looks very similar to a recumbent bicycle. This golf cart allows the golfer to sit comfortably in a chair-like device while propelling himself or herself around the golf course.

The Dmitrowsky Patent (U.S. Pat. No. 4,248,448) is a regular bicycle with an additional chainwheel, chain, crankarms and pedals. Said additions allow the rider to assume a prone position in addition to the "normal" seated position.

The Bothwell Patent (U.S. Pat. No. 3,834,249) is a handgrip for bicycles or motorcycles with a protective yoke.

The Kidney Patent (U.S. Pat. No. 846,033) is a prone bicycle adapted for racing purposes.

The prior art is also found in the lightweight racing bicycles available today. Titanium is very stiff and lightweight and has replaced many heavier, more ductile parts on the racing bicycles. Parts such as the frame are much improved when built with titanium. A new alloy, AerMet 100, could provide even lighter, stronger bicycle parts in the future. Weight is an important factor when determining the quality or efficiency of a bicycle. Racing bicycles under twenty pounds are not uncommon.

Another example of prior art is the ability to break the bike down into smaller parts for easy transportation. Quick-release hubs are useful when trying to put a bicycle in an automobile trunk. These quick-release hubs enable the bicycle owner to remove the wheels with little effort and requires no tools. These same quick-release devices are now being used to allow easer removal of the seat-seatpost assembly.

SUMMARY OF THE INVENTION

The present invention is a bicycle which is lightweight, easily transportable, comfortable, adjustable, efficient, aerodynamic and uses, for the most part, "off the shelf" parts.

This prone bicycle is lightweight. The handlebars are smaller and there are not as many frame tubes. The one major frame tube is a thin-walled telescoping tube with a relatively large diameter for strength. There is no seat, but rather a hammock-type sling which can be made of lightweight nylon.

This prone bicycle is easily transported, despite its length, because it breaks in half along the main tube. Also, since the present invention uses standard parts, quick-release hubs can be used to facilitate "breaking-down" the bicycle.

This prone bicycle is also comfortable because of the soft hammock-style sling which holds the torso. The sling has a large surface area and cut-outs for the arms and shoulders. A slip-cover with gel inside could be slipped onto the upper part of the sling to make the sling even more comfortable. Mounting and dismounting is easy with this bicycle. Also, this bicycle is not as inclined as other prone bicycles, therefore, sliding while riding is not a problem. One of the most significant features of this invention is the position of the rider in between the two wheels. This is an improvement over previous patents and prior devices where the rider's weight is directly over one of the wheels. The present invention is mainly a touring bicycle.

This prone bicycle is adjustable. It uses a standard handlebar stem which can be adjusted up or down. The present invention also has an adjustable main tube to accommodate riders of different inseams. Also, the sling is made to adjust. Also, the handgrips pivot in order to accommodate the rider. The handgrips are located at the end of the handlebars and are used to steer the bicycle by changing the direction of the front wheel (i.e. left or right).

The present invention is efficient in that the line from the rider's shoulder to his or her hands is in line with the line between the rider's hips and the rider's feet. This alignment allows the rider to counteract the pushing force of the rider's legs with an opposite pushing force of the rider's arms. This alignment eliminates a moment from developing which would require wasted effort on the part of the rider in order to counteract. By analogy, a weight-lifter would likewise desire his or her feet to be directly under the weight being lifted in order to eliminate any bending (moment).

The present invention is aerodynamic. While the skin friction coefficient and the surface area remain approximately the same as with a normal bicycle, the view factor from the front is diminished which reduces wind resistance. In other words, the rider's body is more streamlined.

The present invention also uses, for the most part, off the shelf parts. The wheels, derailleurs, crank assembly, brakes, cog, stem, etc. are the same as a regular racing or touring bicycles, therefore, there are plenty of state-of-the-art, lightweight components from which to start from. Further, even parts of the present invention's frame are identical to regular racing and touring bicycles. The head tube, the fork, the bottom bracket, and the chain stays are all the same as with a regular bicycle.

BRIEF DESCRIPTION OF THE DRAWINGS

FIGURE ONE is a side view of the prone bicycle.

FIGURE TWO is a top view of the prone bicycle.

FIGURE THREE is a front view of the prone bicycle.

FIGURE FOUR is a front cross-sectional view of the sling used to support the torso of the rider.

FIGURE FIVE is a top view of the sling with a gel slip cover.

FIGURE SIX is a side view of the sling and main frame tube with clamps.

FIGURE SEVEN is a rear view of the handlebars.

FIGURE EIGHT is an isometric view of the handlebars with a standard stem attached.

DESCRIPTION OF PREFERRED EMBODIMENT

Figure 3:
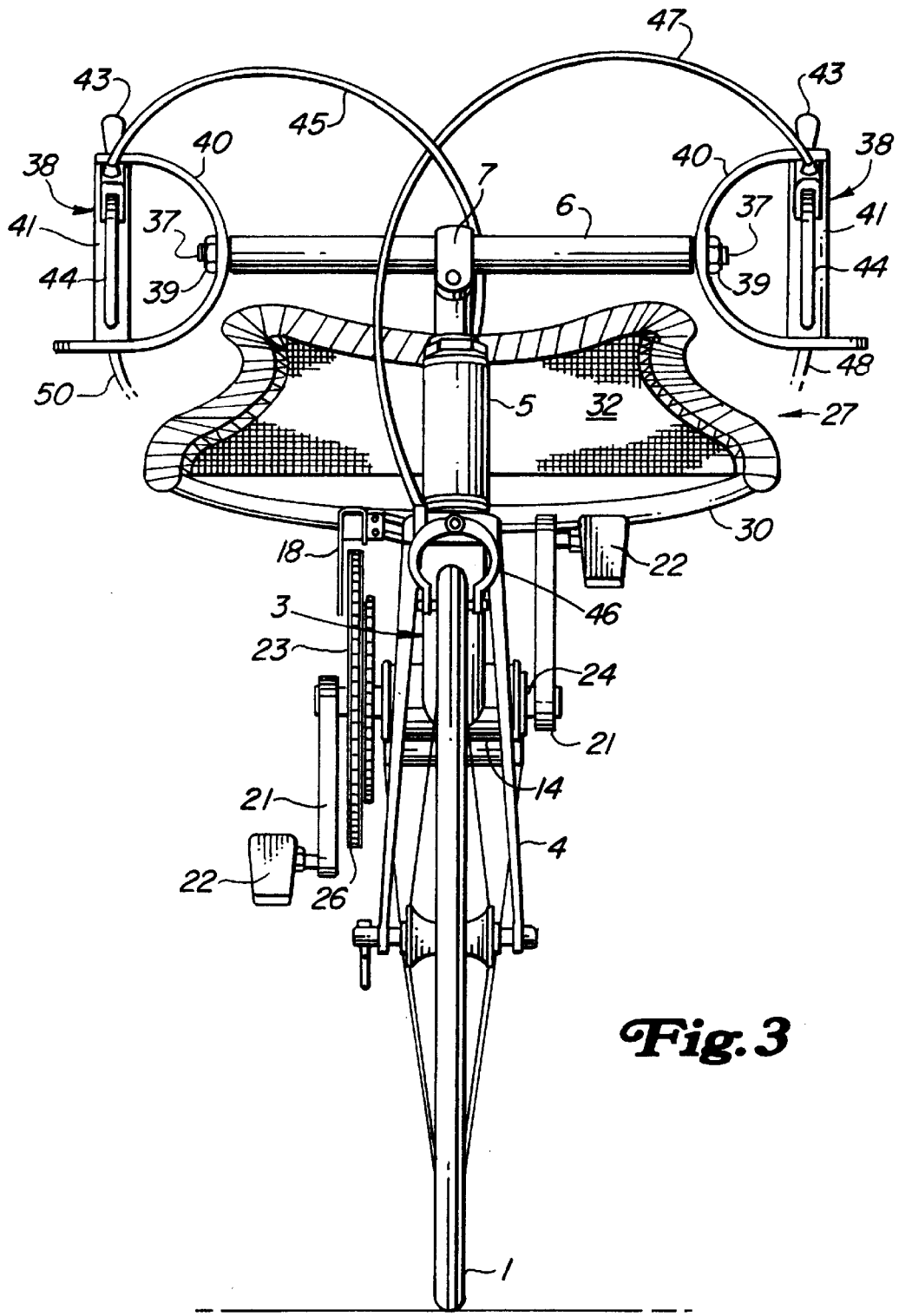

Referring more particularly to FIGS. 1–3 the prone bicycle includes a front wheel 1, a rear wheel 2 and a frame 3. The rear wheel 2 is rotatably connected to the frame 3 so as to allow free rotation of the rear wheel 2. The fork 4 portion of the frame 3 is swivelly connected to the head tube 5 portion of the frame 3. The front wheel 1 is rotatably connected to the fork 4 and preferably smaller than the rear wheel 2. The fork 4 is connected rigidly to the handlebars 6 by way of a stem 7. Steering of the bicycle is accomplished by turning the handlebars 6 which turn the front wheel 1.

The frame 3 is divided into a front portion 8 and a rear portion 9. The front portion 8 is a first main tube 10 connected to the head tube 5. The first main tube has holes 11 in which to accommodate insertion of adjustment cotter pins 12. The rear portion 9 of the frame 3 is comprised of two chain stays 13 connected to a bottom bracket 14. A short up tube 15 is also connected to the bottom bracket 14 as is a second main tube 16 with an outside diameter which is equal to, or slightly less than, the inside diameter of the first main tube 10. The first main tube 10 should be larger than the second main tube 16. The two chain-stays 13 terminate with dropouts 17 in order to accept the rear wheel 2. The up tube 15 is connected to the bottom bracket 14 in an upwardly direction for accepting a front derailleur 18 and the rear brake assembly 19. The second main tube 16 has several holes 20 which align with the holes 11 in the first main tube 10. Once the holes 11 in the first main tube 10 align with the holes 20 in the second main tube 16, cotter pins 12 can be inserted in order to make the frame 3 rigid.

Still referring to FIGS. 1–3, the prone bicycle has a pair of crank arms 21 with a pair of pedals 22 rotatably connected to the crank arms 21. The crankarms 21 are rigidly connected to one another and have one or more chain wheels 23 rigidly connected to them. Said crankarm 21-chainwheel 23 assembly is rotatably connected to the rear portion 9 of the frame 3 by means of a spindle 24 which is housed by the bottom bracket 14. One or more driven sprockets 25 are coupled to the rear wheel 2 and are driven by the rider exerting force on the pedals 22 and said force is transmitted to the rear wheel 3 by means of a chain 26 interconnecting the chainwheel 23 and the driven sprocket 25.

Figure 4:
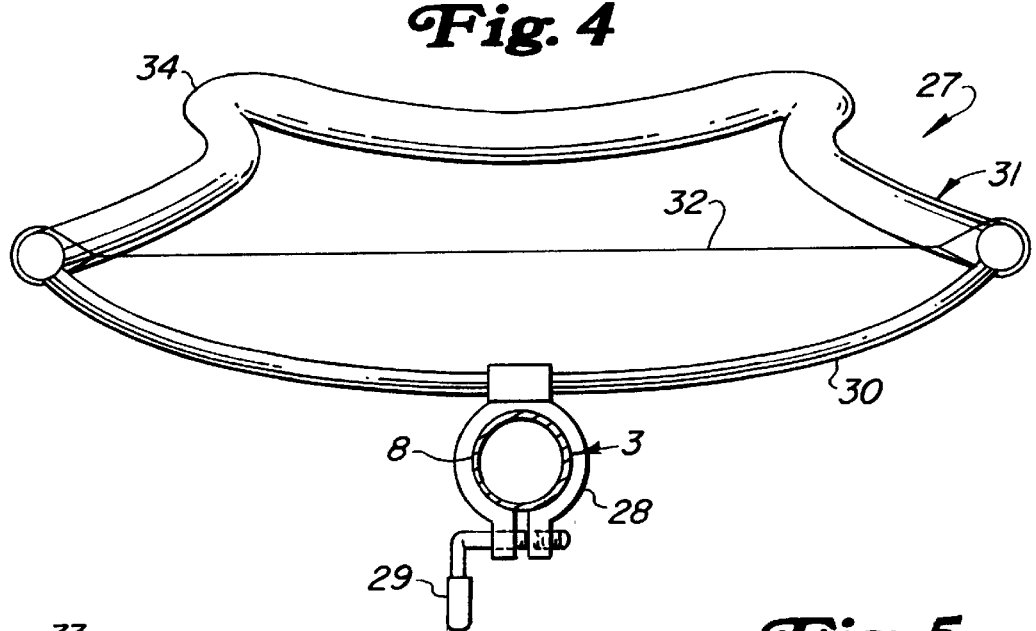
Figure 5:
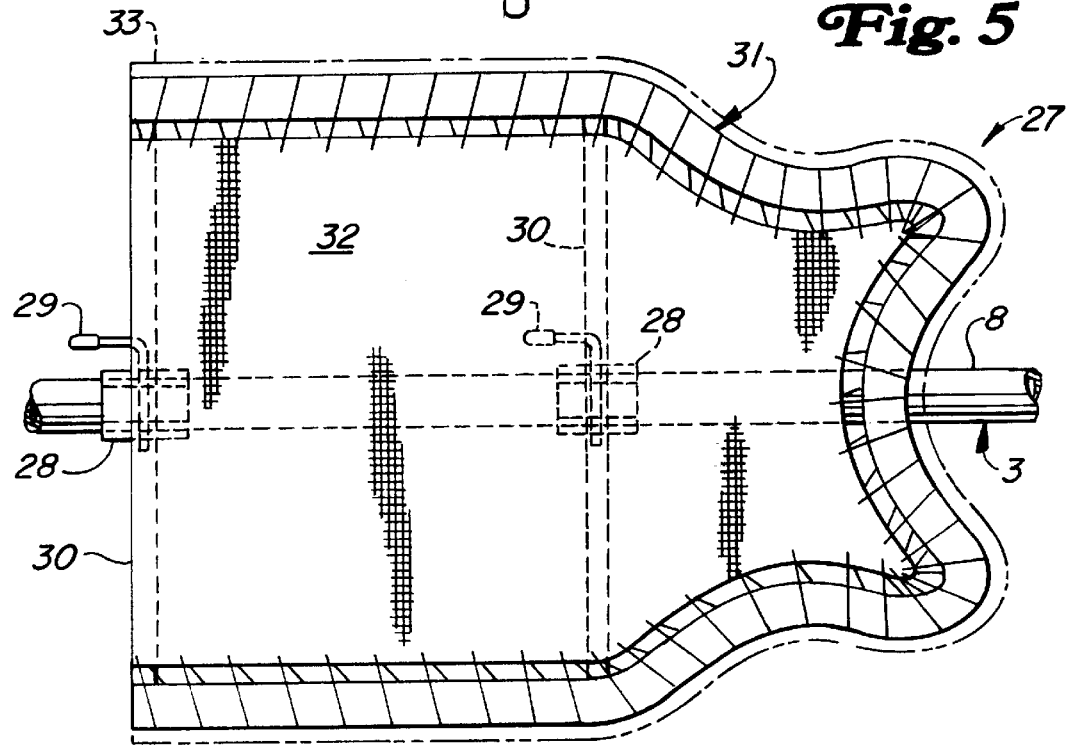
Figure 6:
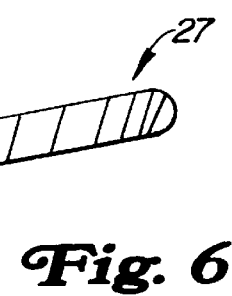

Referring more particularly to FIGS. 4–6, the novel sling 27 is held on to the front portion 8 of the frame 3 by two clamps 28. Said clamps 28 can tighten down on the frame 3 and be loosened by means of a clamp release 29. Said two clamps 28 are welded to two supports 30, one support 30 per clamp 28. Said supports are welded to a sling frame 31. Said sling frame 31 has webbing 32 sewn onto it so that the webbing 32 is relatively tight. A gel slipcover 33 can be slipped on the top portion of the sling 27 for added comfort 33. By loosening the clamp releases 29 and moving the clamps 28 along the front portion 8 of the frame 3, the sling 27 can be repositioned to accommodate riders of differing dimensions. It is preferred that the top portion of the sling 34 tilt up slightly for comfort as the rider will need to be looking up. The sling frame 31 is shaped in such a way as to allow complete freedom of movement of the arms and neck. The webbing 32 supports the load of the rider's torso evenly and allows the rider's chest cavity to expand for normal breathing. Since the sling 27 is not rigid, wasting energy by sliding up and down while peddling is not a problem.

Figure 7:
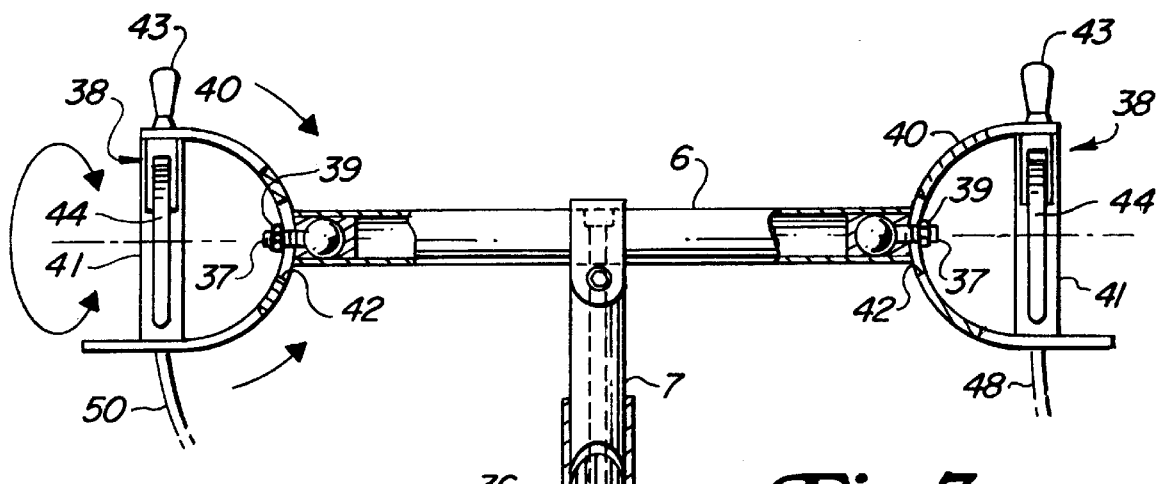
Figure 8:
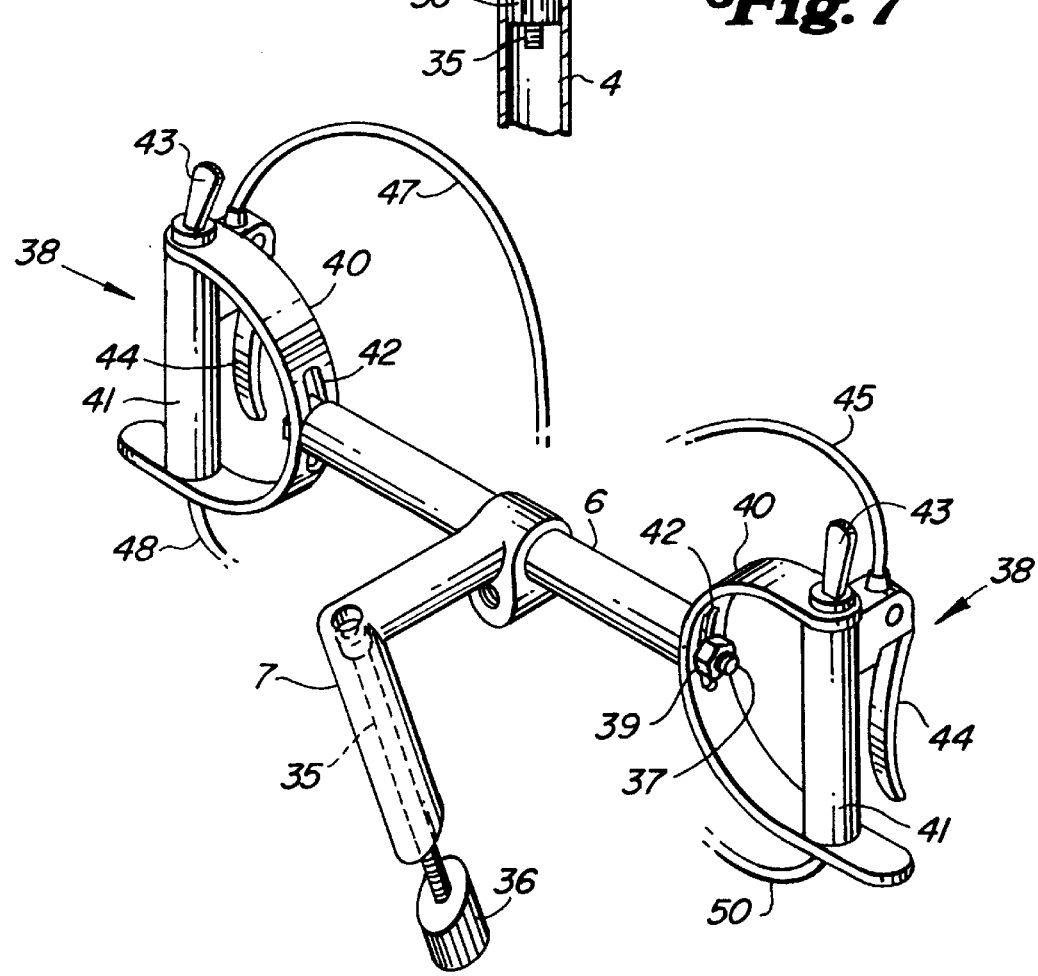

Referring more particularly to FIGS. 7–8, the portion of the fork 4 which extends into the head tube 5 is connected to the stem 7 by means of a stem bolt 35 and a stem dog 36. By tightening the stem bolt 35 the stem dog 36 is wedged tight against the inside diameter of that portion of the fork 4 which extends into the head tube 5. The stem 7 also has an opening through which the handlebars 6 are placed. The handlebars 6 are preferably short and straight and with bolt threads 37 on each end in order to accept the hand-grips 38.

The handgrips 38 are connected to the handlebars 6 with a locking nut 39. Each handgrip 38 has a yoke 40 and a handle 41. Each yoke 40 is concave outward and has a handle 41 attached at the ends. Each yoke 40 has a slot 42 cut axially in the center. It is possible and useful for each yoke 40 to extend beyond each handle 41 so as to provide a surface for the rider to rest his, or her, hands while still gripping the handles 41 while riding. The locking nuts 39 are provided to attach each handgrip 38 securely to the handlebars 6. By loosening the locking nut 39 and resecuring the locking nut 39 on a different portion of the slot 42, a different orientation of the handgrip 38 results. In other words, the hand-grips 38 can be toed-in or toed-out or swivelled. By loosening the locking nut 39 on a handgrip 38, the handgrip 38 can be adjusted to almost any orientation. This is critical on long trips as the particular arm muscles which are being used can tire and cramp. By repositioning the handgrip, certain other arm muscles will be utilized in the exhausted muscle's stead. Each handle 41 has a gear shifter 43 and a brake lever 44 attached thereto.

Referring back to FIGS. 1–3, one brake lever 44 operates the rear brake assembly 19 by means of a rear brake cable 45 which is connected to said brake lever 44 at one end and said rear brake assembly 19 at the other. The other brake lever 44 operates a front brake assembly 46 by means of a front brake cable 47 which is connected to said brake lever 44 at one end and said front brake as assembly 46 at the other. Said front brake assembly 46 is securely fastened to the fork 4. Said front brake assembly 46 and rear brake assembly 19 stop the bicycle by clamping down on the front wheel 1 and rear wheel 2, respectively. One gear shifter 43 operates the front derailleur 18 by means of a front derailleur cable 48 which is connected to the shifter 43 at one end and front derailleur 18 at the other. Said front derailleur 18 changes "gears" (i.e. the ratio of rear wheel 2 revolutions to crankarm 21 revolutions) by changing the chain 26 from one chainwheel 23 to another. The other gear shifter 43 operates a rear derailleur 49 by means of a rear derailleur cable 50 which is connected to the gear shifter 43 at one end and the rear derailleur 49 at the other. Said rear derailleur 49 is securely fastened to one of the dropouts 17. Said rear derailleur changes "gears" by changing the chain 26 from one driven sprocket 25 to another driven sprocket 25 of different size.

What is claimed is:

1. A bicycle for prone face-down bicycle riding comprising a frame having a front portion and a rear portion;

a rotatable rear wheel mounted to the rear portion of said frame;

a fork rotatably connected to the front portion of said frame;

a rotatable front wheel mounted to said fork;

a crank assembly rotatably connected to the rear portion of said frame, said crank assembly comprising two foot pedals rotatably connected to two crank arms which crank arms are rigidly connected to one another with one or more chainwheels rigidly disposed on said crank assembly;

drive means including a chain interconnecting one of said chainwheels with a driven sprocket coupled to said rear wheel for propelling the bicycle;

steering means comprising a pair of handles connected to said fork, each said handle having a general location and orientation; and, a compliant horizontal support adjustably connected to said frame at a plurality of points to support the front torso of the rider in an approximately prone position wherein the compliant horizontal support has cutouts for the arms and neck and also having a front portion and a rear portion whereby the front portion is slightly raised relative to the rear portion.

2. The prone bicycle in claim 1 wherein each of the handle's orientation is adjustable about a horizontal axis and adjustable about an axis perpendicular to said handle and perpendicular to the horizontal axis, said adjustment to the handle orientation being accomplished while maintaining the handle's general location.

3. The prone bicycle in claim 1 wherein the compliant horizontal support is a hammock-style sling comprised of one or more sheets of material attached at two or more places to a sling frame, which sling frame is adjustably connected to said frame.

4. The prone bicycle in claim 3 wherein each of the handle's orientation is adjustable about a horizontal axis and adjustable about an axis perpendicular to said handle and perpendicular to the horizontal axis, said adjustment to the handle orientation being accomplished while maintaining the handle's general location.

5. The prone bicycle is claim 3 wherein each of the handle's orientation is adjustable about a horizontal axis and adjustable about an axis perpendicular to said handle and perpendicular to the horizontal axis, said adjustment to the handle orientation being accomplished without a change in the handle's general location and wherein a surface is rigidly connected to each of said handles whereby the rider may rest his or her hands while riding.

6. The prone bicycle in claim 4 wherein the handles are each connected to a yoke of approximately semicircular shape.

7. The prone bicycle in claim 5 wherein the handles are each connected to a yoke of approximately semicircular shape.

* * * * *